United States Patent [19]

Hirose et al.

[11] Patent Number: 5,733,602
[45] Date of Patent: *Mar. 31, 1998

[54] METHOD FOR PRODUCING HIGHLY PERMEABLE COMPOSITE REVERSE OSMOSIS MEMBRANE

[75] Inventors: Masahiko Hirose; Hiroki Ito; Tomomi Ohara, all of Osaka, Japan

[73] Assignee: Nitto Denko Corporation, Osaka, Japan

[*] Notice: The term of this patent shall not extend beyond the expiration date of Pat. No. 5,576,057.

[21] Appl. No.: 577,158

[22] Filed: Dec. 22, 1995

[30] Foreign Application Priority Data

Dec. 22, 1994 [JP] Japan .................... 6-319716
Sep. 22, 1995 [JP] Japan .................... 7-244418

[51] Int. Cl.$^6$ .................... B05D 3/10; B05D 5/00; C23C 16/00
[52] U.S. Cl. .................... 427/245; 427/255.6; 427/301; 427/340
[58] Field of Search .................... 427/245, 301, 427/393.4, 340, 255.2, 255.6, 316, 385.5; 264/41

[56] References Cited

U.S. PATENT DOCUMENTS

| | | | |
|---|---|---|---|
| Re. 34,115 | 10/1992 | Coplan et al. | 427/245 |
| 4,080,743 | 3/1978 | Manos | 210/500.28 |
| 4,129,559 | 12/1978 | Credali et al. | 264/203 |
| 4,244,817 | 1/1981 | Yaginuma | 427/245 |
| 4,259,183 | 3/1981 | Cadotte | 427/246 |
| 4,307,135 | 12/1981 | Fox | 264/45.5 |
| 4,659,475 | 4/1987 | Liao et al. | 427/244 |
| 4,772,394 | 9/1988 | Swedo et al. | 210/500.38 |
| 4,830,885 | 5/1989 | Tran et al. | 427/245 |
| 4,851,127 | 7/1989 | Lee et al. | 210/654 |
| 4,950,404 | 8/1990 | Chau | 210/500.27 |
| 4,983,291 | 1/1991 | Chau et al. | 210/490 |
| 5,108,607 | 4/1992 | Kraus et al. | 427/245 |
| 5,112,487 | 5/1992 | Himeshima et al. | 427/245 |
| 5,182,024 | 1/1993 | Chen | 210/500.37 |
| 5,259,950 | 11/1993 | Shiro et al. | 210/490 |
| 5,266,197 | 11/1993 | Takata et al. | 210/500.39 |
| 5,271,843 | 12/1993 | Chau et al. | 427/245 |
| 5,358,745 | 10/1994 | Tran et al. | 427/333 |
| 5,443,728 | 8/1995 | Macheras et al. | 210/500.39 |
| 5,576,057 | 11/1996 | Hirose et al. | 427/245 |

FOREIGN PATENT DOCUMENTS

0498596   8/1992   European Pat. Off.

OTHER PUBLICATIONS

Patent Abstracts of Japan, vol. 95, No. 004, 13 Jan. 1995 (Nitto Denko Corp.).
Patent Abstracts of Japan, vol. 017, No. 436 (C–1096), 12 Aug. 1993, (Toray Ind. Inc.) 20 Apr. 1993.
Patent Abstracts of Japan, vol. 011, No. 124 (C–416), 17 Apr. 1987 (NOK Corp.), 21 Nov. 1986.

*Primary Examiner*—Diana Dudash
*Attorney, Agent, or Firm*—Sughrue, Mion, Zinn, Macpeak & Seas, PLLC

[57] ABSTRACT

Disclosed is a method for producing a composite reverse osmosis membrane comprising the steps of coating a porous support with (A) a solution containing a compound having at least two reactive amino groups per molecule and bringing (B) a solution containing a polyfunctional acid halide into contact with the solution (A) to induce crosslinking to form a crosslinked polyamide skin layer, in which the crosslinking is carried out in the presence of a substance having a solubility parameter of 8 to 14 $(cal/cm^3)^{1/2}$. The resulting composite reverse osmosis membrane exhibits high salt rejection and high water permeability.

10 Claims, No Drawings

METHOD FOR PRODUCING HIGHLY PERMEABLE COMPOSITE REVERSE OSMOSIS MEMBRANE

FIELD OF THE INVENTION

This invention relates to a method for producing a composite reverse osmosis membrane for selectively separating a component of a liquid mixture. More particularly, it relates to a method for producing a composite reverse osmosis membrane which is composed of a porous support having a thin film consisting mainly of a polyamide and which exhibits both high salt rejection and high permeability.

The composite reverse osmosis membrane is suitable for production of ultra-pure water or desalting of seawater or brackish water. It makes a contribution to water reclamation in a closed system, in which waste water which would cause environmental pollution, such as waste water from dyeing or waste water from electrodeposition coating, is treated to remove contaminants or to recover effective substances. It is also useful for concentration of an effective ingredient in food industry.

BACKGROUND OF THE INVENTION

A composite reverse osmosis membrane composed of a porous support having formed thereon a thin film capable of selective separation is known as a reverse osmosis membrane, which is structurally different from an asymmetric composite reverse osmosis membrane.

At present, many composite reverse osmosis membranes each having formed on a support a thin film comprising a polyamide obtained by interfacial polymerization of a polyfunctional aromatic amine and a polyfunctional aromatic acid halide are known, e.g., in JP-A-55-147106 (corresponding to U.S. Pat. No. 4,277,344), JP-A-62-121603 (corresponding to U.S. Pat. No. 4,761,234), and JP-A-63-218208 (the term "JP-A" as used herein means an "unexamined published Japanese patent application"). In addition, a support having thereon a polyamide thin film obtained by interfacial polymerization of a polyfunctional aromatic amine and a polyfunctional alicyclic acid halide has also been proposed as disclosed, e.g., in JP-A-61-42308 (corresponding to U.S. Pat. No. 5,254,261).

The conventional composite reverse osmosis membranes have high desalting performance and water permeability, and yet it has been demanded to improve the water permeability while retaining the high desalting performance for attaining higher efficiency. While various additives have been proposed as described, e.g., in JP-A-2-187135 (corresponding to U.S. Pat. No. 4,872,984) in order to meet the demand, the conventional composite reverse osmosis membranes are insufficient, still leaving the demand for higher water permeability unfulfilled.

SUMMARY OF THE INVENTION

An object of the present invention is to provide a method for producing a composite reverse osmosis membrane possessing both high salt rejection and high water permeability.

The object of the present invention is accomplished by a method for producing a composite reverse osmosis membrane comprising the steps of coating a porous support with (A) a solution containing a compound having at least two reactive amino groups per molecule and bringing (B) a solution containing a polyfunctional acid halide into contact with the solution (A) to induce crosslinking to form a crosslinked polyamide skin layer, in which the crosslinking is carried out in the presence of a substance having a solubility parameter of 8 to 14 $(cal/cm^3)^{1/2}$ (hereinafter simply referred to as substance S).

In a preferred embodiment of the above method, substance S is least one member selected from the group consisting of alcohols and ethers.

In another preferred embodiment of the above method, substance S is present in at least one of solution (A) and solution (B).

In a still another preferred embodiment of the above method, substance S is present in the porous support before the contact between solution (A) and solution (B).

In a yet another preferred embodiment of the above method, the step of bringing solutions (A) and (B) into contact with each other to induce crosslinking reaction is conducted at a temperature of 30° to 90° C.

In a further preferred embodiment of the above method, the crosslinking reaction is carried out by bringing solution (A) and solution (B) into contact with each other in a gas phase of substance S.

DETAILED DESCRIPTION OF THE INVENTION

The term "solubility parameter" as used herein denotes a value $(\Delta H/V)^{1/2}$ $(cal/cm^3)^{1/2}$, wherein $\Delta H$ is a molar heat of evaporation (cal/mol) of a liquid, and V is a molar volume ($cm^3$/mol). The solubility parameter can be obtained, for example, according to the method described in the item "Solubility Parameter Values" of "Polymer Handbook", third edition, edited by J. Brandrup and E. H. Immergut and published by John Willey & Sons, Inc. in 1989, and the solubility parameters of various solvents are shown on pages VII-526 to VII-532 of the document.

According to the constitution of the present invention, in a method for producing a composite reverse osmosis membrane comprising the steps of coating a porous support with (A) a solution containing a compound having at least two reactive amino groups per molecule and bringing (B) a solution containing a polyfunctional acid halide into contact with the solution (A) to induce crosslinking to form a crosslinked polyamide skin layer, the presence of substance S in the site of the crosslinking reaction realizes production of a composite reverse osmosis membrane having both high salt rejection and high water permeability.

It is preferable for assuring a particularly high salt rejection and particularly high water permeability that substance S be at least one member selected from the group consisting of an alcohol and an ether.

It is preferable for obtaining an increased permeation flux to add substance S to at least one of solution B and solution A. Where substance S is added to solution A, it is preferably added in an amount of 10 to 50% by weight. If the amount is less than 10% by weight, the effect of increasing the permeation flux is liable to be insufficient. If it exceeds 50% by weight, the rejection tends to be reduced. If added to solution B, substance S is added in an amount of 0.001 to 10% by weight. If the amount is less than 0.001% by weight, the effect of increasing the permeation flux is be liable to be insufficient. If it exceeds 10% by weight, the rejection tends to be reduced.

It is preferable for obtaining a particularly high salt rejection and particularly high water permeability to previously impregnate a porous support with substance S before the step of bringing solution A and solution B into contact with each other. Impregnation of a porous support with substance S is carried out by, for example, dipping, coating, spraying, and the like. Impregnation may be conducted in an arbitrary stage before or during crosslinking.

It is preferable for achieving an increased permeation flux to carry out the step of bringing solution A and solution B into contact with each other to induce crosslinking at a temperature of 30° to 90° C., especially 30° to 60° C.

It is preferable for attaining a particularly high salt rejection and a particularly high permeation flux to bring solution A and solution B into contact with each other to induce crosslinking in a gas phase of substance S.

The method of the present invention is characterized in that the interfacial polycondensation reaction between a polyfunctional acid halide and a compound having at least two reactive amino groups per molecule is performed in the presence of substance S, i.e., a substance having a solubility parameter of 8 to 14 $(cal/cm^3)^{1/2}$, preferably 8 to 14 $(cal/cm^3)^{1/2}$. Presence of a substance having a solubility parameter of less than 8 $(cal/cm^3)^{1/2}$ produces no substantial effect of improving water permeability. A substance having solubility parameter of more than 14 $(cal/cm^3)^{1/2}$ is difficult to mix with solution B.

Where substance B is added to solution B, the amount to be added is from 0.001 to 10% by weight, preferably 0.05 to 5% by weight. If the amount is less than 0.001% by weight, there is a possibility that the effect of increasing the permeation flux is insubstantial. If it exceeds 10% by weight, there is a possibility that an interfacial membrane is not formed satisfactorily.

Substance S which can be used in the present invention is not particularly limited as far as its solubility parameter falls within the range of from 8 to 14 $(cal/cm^3)^{1/2}$ and includes alcohols, ethers, ketones, esters, halogenated hydrocarbons, and sulfur-containing compounds.

Examples of alcohols suitable as substance S are ethanol, propanol, 1-butanol, 2-butanol, 1-pentanol, 2-pentanol, t-amyl alcohol, isoamyl alcohol, isobutyl alcohol, isopropyl alcohol, undecanol, 2-ethylbutanol, 2-ethylhexanol, octanol, cyclohexanol, tetrahydrofurfuryl alcohol, neopentyl glycol, t-butanol, benzyl alcohol, 4-methyl-2-pentanol, 3-methyl-2-butanol, pentyl alcohol, allyl alcohol, ethylene glycol, diethylene glycol, triethylene glycol, and tetraethylene glycol.

Examples of suitable ethers are anisole, ethyl isoamyl ether, ethyl t-butyl ether, ethyl benzyl ether, crown ether, cresyl methyl ether, diisoamyl ether, diisopropyl ether, diethyl ether, dioxane, diglycidyl ether, cineole, diphenyl ether, dibutyl ether, dipropyl ether, dibenzyl ether, dimethyl ether, tetrahydropyran, tetrahydrofuran, trioxane, dichloroethyl ether, butyl phenyl ether, furan, methyl t-butyl ether, monodichlorodiethyl ether, ethylene glycol dimethyl ether, ethylene glycol diethyl ether, ethylene glycol dibutyl ether, ethylene glycol monomethyl ether, ethylene glycol monoethyl ether, ethylene glycol monobutyl ether, diethylene glycol dimethyl ether, diethylene glycol diethyl ether, diethylene glycol dibutyl ether, diethylene glycol monomethyl ether, diethylene glycol monoethyl ether, diethylene glycol monobutyl ether, and diethylene chlorohydrine.

Examples of suitable ketones are ethyl butyl ketone, diacetone alcohol, diisobutyl ketone, cyclohexanone, 2-heptanone, methyl isobutyl ketone, methyl ethyl ketone, and methylcyclohexane.

Examples of suitable esters are methyl formate, ethyl formate, propyl formate, butyl formate, isobutyl formate, isoamyl formate, methyl acetate, ethyl acetate, propyl acetate, butyl acetate, isobutyl acetate, and amyl acetate.

Examples of suitable halogenated hydrocarbons are allyl chloride, amyl chloride, dichloromethane, and dichloroethane.

Examples of suitable sulfur-containing compounds are dimethyl sulfoxide, sulfolane, and thiolane.

Of these compounds, alcohols and ethers are preferred. These compounds may be used either individually or in combination of two or more thereof.

The amine component contained in solution A is not particularly limited as long as it is a polyfunctional compound having two or more reactive amino groups per molecule, and includes aromatic, aliphatic or alicyclic polyfunctional amines. Examples of the aromatic polyfunctional amines are m-phenylenediamine, p-phenylenediamine, 1,3,5-triaminobenzene, 1,2,4-triaminobenzene, 3,5-diaminobenzoic acid, 2,4-diaminotoluene, 2,4-diaminoanisole, amidol, and xylylenediamine. Examples of the aliphatic polyfunctional amines are ethylenediamine, propylene diamine, and tris(2-aminoethyl)amine. Examples of the alicyclic polyfunctional amines are 1,3-diaminocyclohexane, 1,2-diaminocyclohexane, 1,4-diaminocyclohexane, piperazine, 2,5-dimethylpiperazine, and 4-aminomethylpiperazine. These amines may be used either individually or as a mixture thereof.

The polyfunctional acid halide which is contained in solution B is not particularly limited and includes aromatic, aliphatic or alicyclic polyfunctional acid halides. Examples of the aromatic polyfunctional acid halides are trimesic acid chloride, terephthalic acid chloride, isophthalic acid chloride, biphenyldicarboxylic acid chloride, naphthalenedicarboxylic acid dichloride, benzenetrisulfonic acid chloride, benzenedisulfonic acid chloride, and chlorosulfonylbenzenedicarboxylic acid chloride.

Examples of the aliphatic polyfunctional acid halides include propanetricarboxylic acid chloride, butanetricarboxylic acid chloride, pentanetricarboxylic acid chloride, a glutaryl halide, and an adipoyl halide.

Examples of the alicyclic polyfunctional acid halides are cyclopropanetricarboxylic acid chloride, cyclobutanetetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclopentanedicarboxylic acid chloride, cyclobutanedicarboxylic acid chloride, cyclohexanedicarboxylic acid chloride, and tetrahydrofurandicarboxylic acid chloride.

The above-mentioned amine component and acid halide component are subjected to interfacial polymerization to form a thin film consisting mainly of a crosslinked polyamide on a porous support thereby providing a composite reverse osmosis membrane.

The porous support which can be used in the present invention is not particularly limited as far as it can support the thin film. For example, polysulfone, polyaryl ether sulfone such as polyether sulfone, polyimide, and polyvinylidene fluoride may be mentioned. In particular, a porous support comprised of polysulfone or polyaryl ether sulfone is preferred for their chemical, mechanical and thermal stability. While not limiting, the porous support usually has a thickness of about 25 to 125 μm, preferably about 40 to 75 μm.

In carrying out the interfacial polymerization, solution A containing the amine component is applied to the porous support to form a first layer, and a layer consisting of solution B containing the acid halide component is then formed on the first layer to conduct interfacial polycondensation to form a thin film composed of a crosslinked polyamide on the porous support.

In order to facilitate film formation or to improve the performance of the resulting composite reverse osmosis membrane, solution A containing the polyfunctional amine may contain a small amount of a polymer, such as polyvinyl alcohol, polyvinylpyrrolidone or polyacrylic acid, or a polyhydric alcohol, such as sorbitol or glycerol.

The amine salts described in JP-A-2-187135 (corresponding to U.S. Pat. No. 4,872,984), such as salts of tetraalkylammonium halides or trialkylamines with organic acids, may also be added to solution A for the purpose of facilitating film formation, improving penetrability of the amine solution into the support, and accelerating the condensation reaction.

Surface active agents, such as sodium dodecylbenzenesulfonate, sodium dodecylsulfate, and sodium lauryl sulfate, may also be incorporated into solution A. These surface active agents are effective to improve wettability of solution A to a porous support.

In order to accelerate the polycondensation in the interface, it is beneficial to use sodium hydroxide or sodium tertiary phosphate, which is capable of removing a hydrogen halide generated from the interfacial reaction, or an acylation catalyst. As stated above, solution A may contain substance S in order to improve the permeation flux.

The concentrations of the acid halide or polyfunctional amine in solutions B or A are not particularly limited. In general, the concentration of the acid halide in solution B is 0.01 to 5% by weight, preferably 0.05 to 1% by weight, and that of the polyfunctional amine in solution A is 0.1 to 10% by weight, preferably 0.5 to 5% by weight.

After solution A is applied to the porous support and solution B is applied thereon, excess of the solvent is removed from both solutions, and the coating layers are heat dried generally in the range of about 20° to 150° C., preferably about 70° to 130° C., for about 1 to 10 minutes, preferably about 2 to 8 minutes, to form a water-permeable thin film consisting of a crosslinked polyamide. The thin film usually has a thickness of about 0.05 to 2 µm, preferably about 0.1 to 1 µm.

If desired, the resulting composite reverse osmosis membrane may be subjected to a chlorine treatment with hypochlorous acid, etc. for further improving the salt rejection performance as described in JP-B-63-36803 (the term "JP-B" as used herein means an "examined published Japanese patent application").

The present invention will now be illustrated in greater detail with reference to Examples, but it should be understood that the present invention is not construed as being limited thereto. Unless otherwise indicated, all the percents are by weight.

EXAMPLE 1

Aqueous solution A containing 2.0% m-phenylenediamine, 0.15% sodium lauryl sulfate, 2.0% triethylamine, and 4.0% camphorsulfonic acid was applied to a porous polysulfone supporting membrane, and excess of solution A was removed to form a layer of solution A on the supporting membrane.

Hexane solution B containing 0.20% trimesic acid chloride and 0.5% t-butanol was then applied onto the layer of solution A, and the coated supporting membrane was maintained in a hot air drier at 120° C. for 3 minutes to form a polymer thin film on the supporting membrane.

The performance of the resulting composite reverse osmosis membrane was evaluated by testing against an aqueous solution containing 1500 ppm of sodium chloride (pH 6.5) under a pressure of 15 kgf/cm$^2$. As a result, the salt rejection was 99.4% as measured from the conductivity of the permeated liquid, and the permeation flux was 1.1 m$^3$/m$^2$·day. These results are shown in Table 1 below.

COMPARATIVE EXAMPLES 1 AND 2

Composite reverse osmosis membranes were obtained in the same manner as in Example 1, except for changing the t-butanol concentration to 0% (no additive) or 20%. The test results are shown in Table 1.

EXAMPLES 2 TO 5

Composite reverse osmosis membranes were obtained in the same manner as in Example 1, except for adding 20% isopropyl alcohol to solution A and replacing the t-butanol of solution B with 0 to 0.3% isopropyl alcohol. The test results are shown in Table 1.

EXAMPLES 6 TO 12 AND COMPARATIVE EXAMPLE 3

Composite reverse osmosis membranes were obtained in the same manner as in Example 1, except for changing the concentration of the trimesic acid chloride in solution A to 0.15% and replacing the t-butanol of solution B with 0.1% of various ethers shown in Table 1. The test results are shown in Table 1.

TABLE 1

| Example No. | Additive in Solution A (Concn.; wt %) | Solution B Additive (Concn.; wt %) | Trimesic Acid Chloride (wt %) | Salt Rejection (%) | Permeation Flux (m$^3$/m$^2$ · day) |
|---|---|---|---|---|---|
| Example 1 | none | t-butyl alcohol (0.5) | 0.2 | 99.4 | 1.1 |
| Compara. Example 1 | none | none (t-butyl alcohol: 0) | 0.2 | 99.7 | 0.7 |
| Compara. Example 2 | none | t-butyl alcohol (20) | 0.2 | 16 | 17 |
| Example 2 | isopropyl alcohol (20) | none (isopropyl alcohol: 0) | 0.2 | 99.7 | 1.5 |
| Example 3 | isopropyl alcohol (20) | isopropyl alcohol (0.1) | 0.2 | 99.5 | 1.9 |
| Example 4 | isopropyl | isopropyl alcohol (0.2) | 0.2 | 99.5 | 1.9 |

TABLE 1-continued

| Example No. | Additive in Solution A (Concn.; wt %) | Solution B Additive (Concn.; wt %) | Trimesic Acid Chloride (wt %) | Salt Rejection (%) | Permeation Flux ($m^3/m^2 \cdot day$) |
| --- | --- | --- | --- | --- | --- |
| Example 5 | alcohol (20) isopropyl alcohol (20) | isopropyl alcohol (0.3) | 0.2 | 99.5 | 1.6 |
| Example 6 | none | ethylene glycol monomethyl ether (0.1) | 0.15 | 99.7 | 1.5 |
| Example 7 | none | ethylene glycol monoethyl ether (0.1) | 0.15 | 99.3 | 1.8 |
| Example 8 | none | ethylene glycol monomethyl ether acetate (0.1) | 0.15 | 99.7 | 1.3 |
| Example 9 | none | ethylene glycol monobutyl ether acetate (0.1) | 0.15 | 99.7 | 1.3 |
| Example 10 | none | diethylene glycol dimethyl ether (0.1) | 0.15 | 99.7 | 1.4 |
| Example 11 | none | diethylene giycol diethyl ether (0.1) | 0.15 | 99.7 | 1.4 |
| Example 12 | none | diethylene glycol dibutyl ether (0.1) | 0.15 | 99.7 | 1.2 |
| Compara. Example 3 | none | none | 0.15 | 99.7 | 1.0 |

EXAMPLE 13

A porous polysulfone supporting membrane was dipped in a 20% aqueous solution of isopropyl alcohol for 10 minutes. Thereafter, aqueous solution A containing 2.0% m-phenylenediamine, 0.15% sodium lauryl sulfate, 2.0% triethylamine, and 4.0% camphorsulfonic acid was then applied onto the isopropyl alcohol-impregnated porous supporting membrane, and excess of solution A was removed to form a layer of solution A on the supporting membrane.

Hexane solution B containing 0.20% trimesic acid chloride was brought into contact with the layer of solution A, and the coated supporting membrane was maintained in a hot air drier at 120° C. for 3 minutes to form a polymer thin film on the supporting membrane.

The performance of the resulting composite reverse osmosis membrane was evaluated in the same manner as in Example 1. As a result, the salt rejection was 99.6%, and the permeation flux was 1.4 $m^3/m^2 \cdot day$. These results are shown in Table 2 below.

COMPARATIVE EXAMPLE 4

A composite reverse osmosis membrane was obtained in the same manner as in Example 13, except that the porous polysulfone supporting membrane was dipped in water which did not contain isopropyl alcohol. The test results are shown in Table 2.

EXAMPLES 14 TO 15

Composite reverse osmosis membranes were obtained in the same manner as in Example 13, except that dipping of the porous polysulfone supporting membrane in an isopropyl alcohol aqueous solution was replaced with coating or spraying with a 20% isopropyl alcohol aqueous solution. The test results are shown in Table 2.

EXAMPLE 16

A composite reverse osmosis membrane was obtained in the same manner as in Example 14, except that the isopropyl alcohol aqueous solution was replaced with a 10% ethylene glycol monoethyl ether aqueous solution. The test results are shown in Table 2.

TABLE 2

| Example No. | Treatment of Porous Support | | 1500 ppm NaCl Aqueous Solution | |
| --- | --- | --- | --- | --- |
| | Treating Aqueous Solution (Concn.; wt %) | Treating Method | Salt Rejection (%) | Permeation Flux ($m^3/m^2 \cdot day$) |
| Example 13 | isopropyl alcohol (20) | dipping | 99.6 | 1.4 |
| Compara. Example 4 | none (water alone) | dipping | 99.7 | 0.7 |
| Example 14 | isopropyl alcohol (20) | coating | 99.6 | 1.3 |
| Example 15 | isopropyl alcohol (20) | spraying | 99.6 | 1.4 |
| Example 16 | ethylene glycol monoethyl ether (10) | coating | 99.5 | 1.2 |

EXAMPLE 17

Aqueous solution A containing 2.0% m-phenylenediamine, 0.15% sodium lauryl sulfate, 2.0% triethylamine, 4.0% camphorsulfonic acid, and 20% isopropyl alcohol was applied to a porous polysulfone supporting membrane, and excess of solution A was removed to form a layer of solution A on the supporting membrane.

A 0.15% solution of trimesic acid chloride in IP 1016 (isoparaffinic hydrocarbon oil produced by Idemitsu Petrochemical Co., Ltd.) was prepared as solution B. Solution B was heated to 40° C. and brought into contact with the layer of solution A at that temperature, and the coated supporting membrane was maintained in a hot air drier at 120° C. for 3 minutes to form a polymer thin film on the supporting membrane.

The performance of the resulting composite reverse osmosis membrane was evaluated by testing against an aqueous solution containing 1500 ppm of sodium chloride (pH 6.5) under a pressure of 15 kgf/cm². As a result, the salt rejection was 99.7% as measured from the conductivity of the permeated liquid, and the permeation flux was 1.7 m³/m²·day. These results are shown in Table 3 below.

EXAMPLES 18 TO 20

Composite reverse osmosis membranes were prepared in the same manner as in Example 17, except for changing the temperature of solution B as shown in Table 3. The test results are also shown in Table 3.

COMPARATIVE EXAMPLES 5 TO 6

Composite reverse osmosis membranes were prepared in the same manner as in Example 17, except that solution A contained no isopropyl alcohol, and the temperature of solution B was changed as shown in Table 3. The test results obtained are shown in Table 3.

TABLE 3

| Example No. | Additive in Solution A (Concn.; wt %) | Temp. of Solution B (°C.) | 1500 ppm NaCl Aq. Soln. | |
|---|---|---|---|---|
| | | | Salt Rejection (%) | Permeation Flux (m³/m² · day) |
| Example 17 | isopropyl alcohol (20) | 40 | 99.7 | 1.7 |
| Example 18 | isopropyl alcohol (20) | 20 | 99.7 | 1.4 |
| Example 19 | isopropyl alcohol (20) | 50 | 99.5 | 1.6 |
| Example 20 | isopropyl alcohol (20) | 60 | 99.5 | 1.6 |
| Compara. Example 5 | none | 20 | 99.6 | 0.9 |
| Compara. Example 6 | none | 50 | 99.7 | 0.9 |

EXAMPLE 21

Aqueous solution A containing 2.0% m-phenylenediamine, 0.15% sodium lauryl sulfate, 2.0% triethylamine, and 4.0% camphorsulfonic acid was brought into contact with a porous polysulfone supporting membrane for several seconds, and excess of solution A was removed to form a layer of solution A on the supporting membrane.

Isopropyl alcohol was heated to generate isopropyl alcohol vapor, and a 0.20% hexane solution of trimesic acid chloride (solution B) was brought into contact with the layer of solution A in the isopropyl alcohol vapor atmosphere. The coated supporting membrane was maintained in a hot air drier at 120° C. for 3 minutes to form a polymer thin film on the supporting membrane.

The performance of the resulting composite reverse osmosis membrane was evaluated by testing against an aqueous solution containing 1500 ppm of sodium chloride (pH 6.5) under a pressure of 15 kgf/cm². As a result, the salt rejection was 99.6% as measured from the conductivity of the permeated liquid, and the permeation flux was 1.0 m³/m²·day.

COMPARATIVE EXAMPLE 7

A composite reverse osmosis membrane was prepared in the same manner as in Example 21, except that the contact of solution B was not in an isopropyl alcohol atmosphere. When evaluated in the same manner as in Example 21, the resulting membrane had a salt rejection of 99.7% and a permeation flux of 0.7 m³/m²·day.

As has been described and demonstrated, the method of the present invention comprises the steps of coating a porous support with solution (A) containing a compound having two or more reactive amino groups per molecule and bringing solution (B) containing a polyfunctional acid halide into contact with solution (A) to induce crosslinking to form a crosslinked polyamide skin layer, in which the crosslinking is carried out in the presence of a substance having a solubility parameter of 8 to 14 $(cal/cm^3)^{1/2}$.

The composite reverse osmosis membrane of the present invention exhibits both high salt rejection and high permeability and makes it possible to conduct practical desalting under a relatively low pressure. Accordingly, the membrane of the present invention is suited for desalting of brackish water or seawater to obtain fresh water and preparation of ultra-pure water necessary for semiconductor manufacturing.

While the invention has been described in detail and with reference to specific embodiments thereof, it will be apparent to one skilled in the art that various changes and modifications can be made therein without departing from the spirit and scope thereof.

What is claimed is:

1. A method for producing a composite reverse osmosis membrane comprising the steps of coating a porous support with (A) a solution containing a compound having at least two reactive amino groups per molecule and bringing (B) a solution containing a polyfunctional acid halide into contact with the solution (A) to induce crosslinking to form a crosslinked polyamide skin layer, in which the crosslinking is carried out in the presence of a substance having a solubility parameter of 8 to 14 $(cal/cm^3)^{1/2}$ and that is at least one member selected from the group consisting of alcohols and ethers, with the proviso that where the substance is added in solution (B), it is added in an amount of 0.001 to 10% by weight, wherein the step of bringing solutions (A) and (B) into contact with each other to induce crosslinking reaction is conducted at a temperature of 30° to 90° C.

2. The method for producing a composite reverse osmosis membrane of claim 1, wherein said substance having a solubility parameter of 8 to 14 $(cal/cm^3)^{1/2}$ is present in at least one of solution (A) and solution (B).

3. The method for producing a composite reverse osmosis membrane of claim 1, wherein the porous support is previously impregnated with said substance having a solubility parameter of 8 to 14 $(cal/cm^3)^{1/2}$ before the contact between solution (A) and solution (B).

4. The method for producing a composite reverse osmosis membrane of claim 1, wherein the crosslinking reaction is carried out by bringing solution (A) and solution (B) into contact with each other in a gas phase of said substance having a solubility parameter of 8 to 14 $(cal/cm^3)^{1/2}$.

5. A method for producing a composite reverse osmosis membrane comprising the steps of coating a porous support with (A) a solution containing a compound having at least two reactive amino groups per molecule and bringing (B) a solution containing a polyfunctional acid halide into contact with the solution (A) to induce crosslinking to form a crosslinked polyamide skin layer, in which the crosslinking is carried out in the presence of a substance having a solubility parameter of 8 to 14 $(cal/cm^3)^{1/2}$, with the proviso that where the substance is added in solution B, it is added in an amount of 0.001 to 10% by weight, wherein the substance is selected from the group consisting of ethanol, propanol, 1-butanol, 2-butanol, 1-pentanol, 2-pentanol, t-amyl alcohol, isoamyl alcohol, isobutyl alcohol, isopropyl alcohol, undecanol, 2-ethylbutanol, 2-ethylhexanol, octanol, cyclohexanol, tetrahydrofurfuryl alcohol, t-butanol, benzyl alcohol, 4-methyl-2-pentanol, 3-methyl-2-butanol, pentyl alcohol, allyl alcohol, ethyl isoamyl ether, ethyl t-butyl ether, ethyl benzyl ether, diisoamyl ether, diisopropyl ether, diethyl ether, diglycidyl ether, diphenyl ether, dibutyl ether, dipropyl ether, dibenzyl ether, dimethyl ether, dichloroethyl ether, butyl phenyl ether, methyl t-butyl ether, monodichlorodiethyl ether, ethylene glycol dimethyl ether, ethylene glycol diethyl ether, ethylene glycol dibutyl ether, ethylene glycol monomethyl ether, ethylene glycol monoethyl ether, ethylene glycol monobutyl ether, diethylene glycol dimethyl ether, diethylene glycol diether ether, diethylene glycol dibutyl ether, diethylene glycol monomethyl ether, diethylene glycol monoethyl ether and diethylene glycol monobutyl ether.

6. The method for producing a composite reverse osmosis membrane of claim 5, wherein said substance having a solubility parameter of 8 to 14 $(cal/cm^3)^{1/2}$ is present in at least one of solution (A) and solution (B).

7. The method for producing a composite reverse osmosis membrane of claim 5, wherein the porous support is previously impregnated with said substance having a solubility parameter of 8 to 14 $(cal/cm^3)^{1/2}$ before the contact between solution (A) and solution (B).

8. The method for producing a composite reverse osmosis membrane of claim 5, wherein the step of bringing solutions (A) and (B) into contact with each other to induce crosslinking reaction is conducted at a temperature of 30° to 90° C.

9. The method for producing a composite reverse osmosis membrane of claim 5, wherein the crosslinking reaction is carried out by bringing solution (A) and solution (B) into contact with each other in a gas phase of said substance having a solubility parameter of 8 to 14 $(cal/cm^3)^{1/2}$.

10. A method for producing a composite reverse osmosis membrane comprising the steps of coating a porous support with (A) a solution containing a compound having at least two reactive amino groups per molecule and bringing (B) a solution containing a polyfunctional acid halide into contact with the solution (A) to induce crosslinking to form a crosslinked polyamide skin layer, in which the crosslinking is carried out in the presence of a substance having a solubility parameter of 8 to 14 $(cal/cm^3)^{1/2}$, with the proviso that where the substance is added in solution (B), it is added in an amount of 0.001 to 10% by weight, wherein the crosslinking reaction is carried out by bringing solution (A) and solution (B) into contact with each other in a gas phase of said substance having a solubility parameter of 8 to 14 $(cal/cm^3)^{1/2}$.

* * * * *